(12) United States Patent
Weik

(10) Patent No.: US 6,219,338 B1
(45) Date of Patent: *Apr. 17, 2001

(54) METHOD OF ESTABLISHING A CONNECTION, AS WELL AS EXCHANGE, SERVICE COMPUTER AND COMMUNICATIONS NETWORK

(75) Inventor: Hartmut Weik, Stuttgart (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/857,241

(22) Filed: May 16, 1997

(30) Foreign Application Priority Data

May 30, 1996 (DE) .............................. 196 21 716

(51) Int. Cl.[7] .......................... G01R 31/08; G06F 11/00; G08C 15/00; H04T 1/16
(52) U.S. Cl. .......................... 370/235; 370/230; 370/351
(58) Field of Search .................................. 370/216, 217, 370/225, 226, 227, 228, 229, 235, 237, 351, 465, 468, 477; 379/207, 220, 221

(56) References Cited

U.S. PATENT DOCUMENTS

| 5,023,868 | 6/1991 | Davidson et al. . |
| 5,051,992 | 9/1991 | Taniguchi et al. . |
| 5,317,566 | * 5/1994 | Joshi ..................... 370/238 |
| 5,375,167 | 12/1994 | Bales et al. . |
| 5,550,906 | * 8/1996 | Chau et al. ............. 379/207 |
| 5,675,577 | * 10/1997 | Komatsu ................ 370/237 |
| 5,898,673 | * 4/1999 | Riggan et al. ......... 370/237 |

FOREIGN PATENT DOCUMENTS

| 2430958 | 10/1975 | (DE) . |
| 2431007 | 1/1976 | (DE) . |
| 3126383 | 1/1983 | (DE) . |
| 1952329 | 1/1996 | (DE) . |

OTHER PUBLICATIONS

"Vernetzte TK–Analgen ohne Grenzen" (Network TK Installations without Limits by Hilmar Dehlen, NTZ, vol. 45, (1992), No. 9 on pp. 714–720.

"A Self–Heating ATM Network Based on Multilink Principles" by Landegem et al, IEEE Journal of Selected Areas in Communications, vol. 12, No. 1, Jan. 1994, pp. 139–148.

* cited by examiner

Primary Examiner—Ajit Patel
Assistant Examiner—Bob A. Phunkulh
(74) Attorney, Agent, or Firm—Ware, Fressola, Van Der Sluys & Adolphson LLP

(57) ABSTRACT

The invention relates to a method for establishing a connection, an exchange and a service computer for carrying out the method and a communications network for establishing connections according to the method. A requesting terminal (TEA) signals a call request (CALL) to a control unit of a first communication network (NET1). The control unit then determines if sufficient free capacity is available in the first communication network (NET1) for establishing the connection requested by the call request. If the capacity is insufficient, then the control unit initiates an alternate setup of the requested connection via a different second communication network (NET2) based on the parameters (PA) assigned to the requesting terminal (TEA).

6 Claims, 2 Drawing Sheets

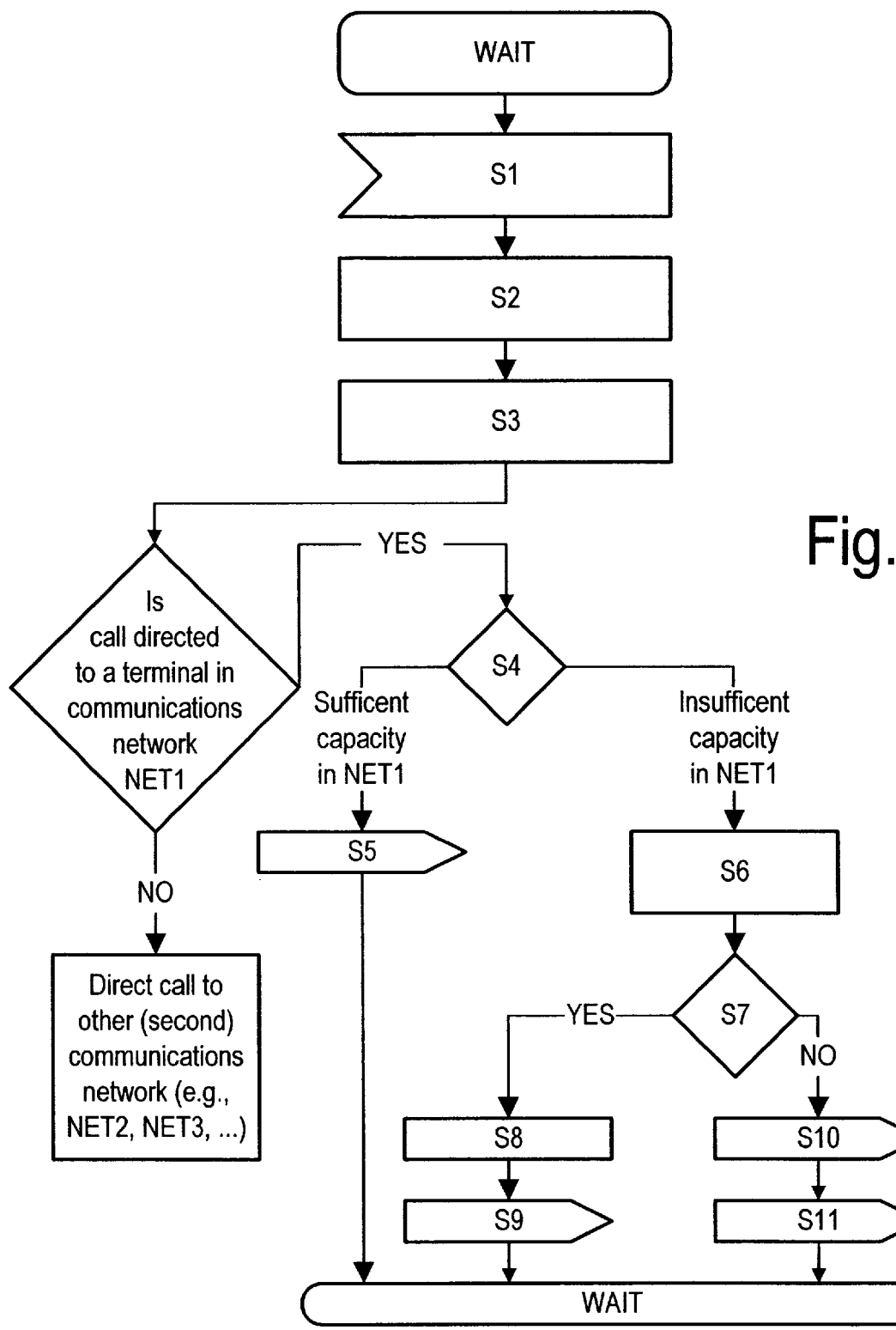

METHOD OF ESTABLISHING A CONNECTION, AS WELL AS EXCHANGE, SERVICE COMPUTER AND COMMUNICATIONS NETWORK

TECHNICAL FIELD

The invention relates to a method of establishing a connection wherein a requesting terminal signals a call request to a control unit of a first communications network, and wherein the control unit determines whether sufficient capacity is available in the first communications network for establishing the connection requested by the call request, such that in the absence of sufficient capacity, the control unit initiates an alternative establishment of the requested connection through another, second communications network based on parameters assigned to the requesting terminal.

The invention is also directed to an exchange of a first communications network with means for receiving a call request from a requesting terminal and with a control unit which is provided with means for determining whether sufficient capacity is available in the first communications network for establishing the connection requested by the call request.

The invention is still further directed to a service computer for a first communications network or for two or more communications networks with means for receiving data of a call request from a requesting terminal and with a control unit which is provided with means for determining whether sufficient capacity is available in the first communications network or in a first of the two or more communications networks for establishing the connection requested by the call request.

It is also directed to a communication network using the above methodology.

BACKGROUND OF THE INVENTION

Approaches for establishing connections in an overloaded communication network are known, in particular, from private communication networks.

The invention is based on a conventional method for establishing a connection, as used with private branch exchange networks, for example with internal company networks which have several network access points to a public telephone network. This method is described, for example, in the article "Network TK Installations without Limits", by Hilmar Dehlen, NTZ, Vol. 45 (1992), No. 9 on pages 714 to 720.

The private communication network is formed by several private branch exchanges interconnected via direct routes. Each of the individual private branch exchanges have network access to the public telephone network. When a private branch exchange receives a call request requesting a connection to a terminal of a different private branch exchange of the private network, and if a bottleneck exists in the private network for establishing the requested connection via links of the private network, then there is an automatic overflow into the public telephone network, i.e. the call request is routed onward from the private branch exchange to the public telephone network, and a connection to the requested terminal is established via the public telephone network.

This method for establishing a connection has the disadvantage that significant expenses are incurred in an overloaded situation, since the public telephone network has to be used without the possibility to achieve a more uniform utilization of the private communication network.

SUMMARY OF THE INVENTION

It is the object of the invention to provide a method for establishing a connection for an overloaded network which allows optimization of the alternate routing in an overloaded situation based on cost and traffic.

This object is solved by a method of establishing a connection wherein a requesting terminal signals a call request to a control unit of a first communications network, and wherein the control unit determines whether sufficient capacity is available in the first communications network for establishing the connection requested by the call request, such that in the absence of sufficient capacity, the control unit initiates an alternative establishment of the requested connection through another, second communications network based on parameters assigned to the requesting terminal.

Another object of the invention is an exchange of a first communications network with means for receiving a call request from a requesting terminal and with a control unit which is provided with means for determining whether sufficient capacity is available in the first communications network for establishing the connection requested by the call request, such that the control unit is designed to initiate an alternative establishment of the requested connection through another, second communications network based on parameters assigned to the requesting terminal if insufficient capacity is determined.

A still further object of the invention is a service computer for a first communications network or for two or more communications networks with means for receiving data of a call request from a requesting terminal and with a control unit which is provided with means for determining whether sufficient capacity is available in the first communications network or in a first of the two or more communications networks for establishing the connection requested by the call request, such that the control unit is designed to initiate an alternative establishment of the requested connection through another, second communications network based on parameters assigned to the requesting terminal if insufficient capacity is determined.

Another object of the invention is a communication network using the above methodology.

The invention is based on the concept to treat, in an overloaded situation, the call request for each terminal on an individual basis, i.e. to decide individually for each terminal if or to which one of several communication networks the call request has to be rerouted and consequently, if or over which communication network the requested connection has to be established. In this way, an individually customized profile for each subscriber can be advantageously established, taking into account the costs associated with an overloaded situation, while the response of a subscriber in an overloaded situation can be controlled by a specific choice of parameters characteristic for a specific terminal, so that a more uniform network utilization can be attained.

It is another advantage of the invention that it can be used in other communication environments besides private branch exchanges and public telephone networks. The invention can be employed in any heterogeneous network environment with several private and/or public communication networks or virtual communication networks. The method of the invention for establishing a connection satisfies, in particular, the requirements created by a deregulated heterogeneous communication environment.

BRIEF DESCRIPTION OF THE DRAWINGS

In the following the invention will be discussed with reference to two exemplary embodiments in conjunction with the accompanying drawings.

FIG. 2 shows a flow diagram of the method of the invention for establishing a connection for the communication network of FIG. 1.

BEST MODE FOR CARRYING OUT THE INVENTION

Figure 1:
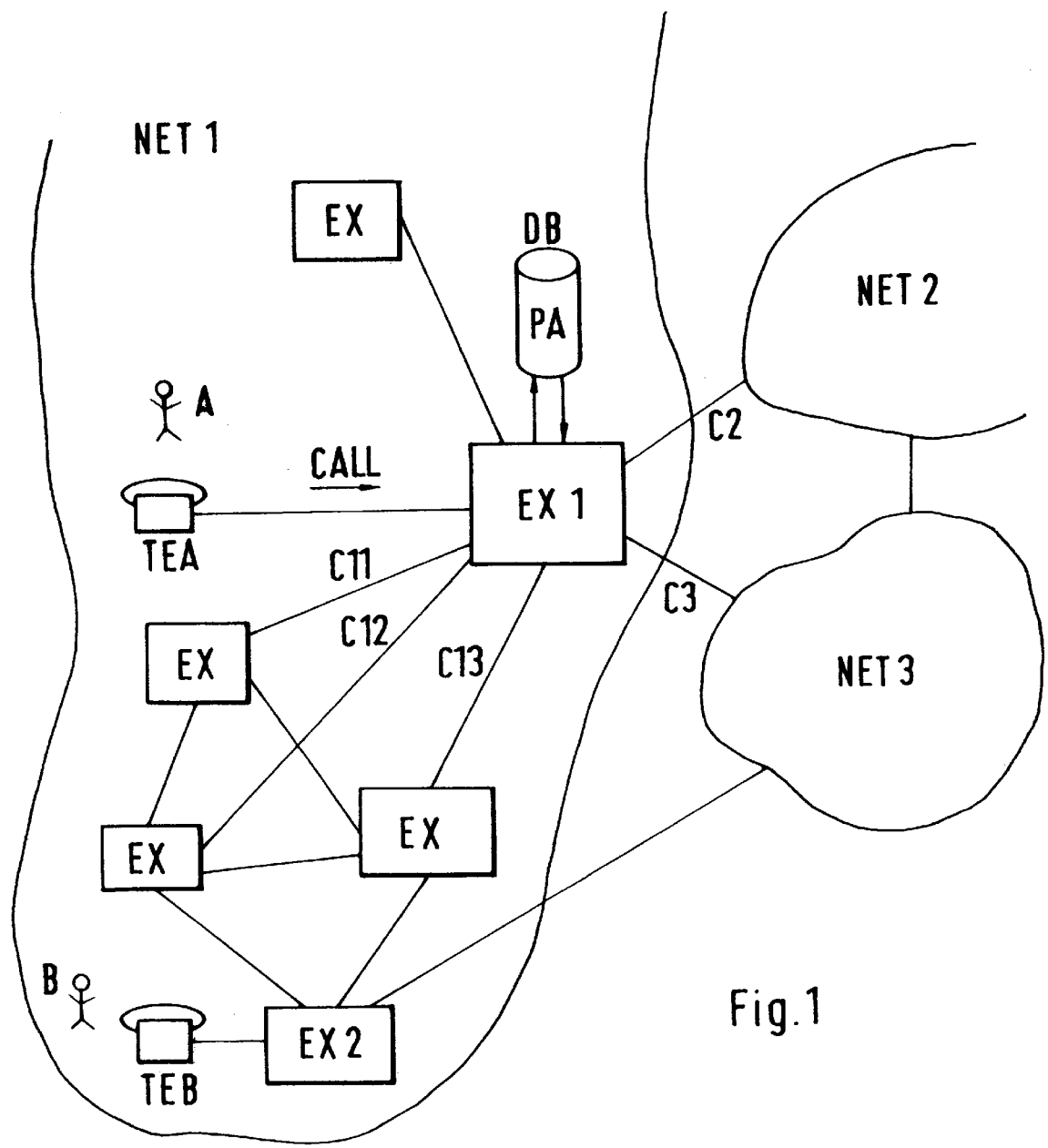
FIG. 1 shows a schematic circuit diagram of a communication environment with a communication network of the invention.

In the first embodiment, there will be described the implementation of the method of the invention for establishing a connection in a communication network of the invention provided with an exchange according to the invention.

FIG. 1 shows three communication networks NET1 to NET3 which are interconnected with each other.

The communication networks NET2 and NET3 are public communication networks of two different network operators. The communication network NET1 is a private communication network. It is, however, also possible that communication network NET1 is a public communication network of a third network operator. The communication networks NET2 and NET3 can also be two different private communication networks.

The communication network NET1 comprises several exchanges EX, EX1 and EX2, and two terminals TEA and TEB associated with a subscriber A and a subscriber B, respectively. The terminals TEA and TEB are connected with the exchanges EX1 and EX2, respectively. The exchanges EX1 and EX2 are connected to each other via several exchanges EX. The exchange EX1 is connected to the communication network NET2 and NET3 respectively via two network access points C2 and C3. The exchange EX2 is connected to the communication network NET3.

The terminals TEA and TEB are conventional telephone terminals, for example, telephone terminals, fax machines, or data processing devices provided with a modem or a respective interface card. The terminals may also be analog or a digital (ISDN=Integrated Services Digital Network) terminals.

The exchanges EX, EX1 and EX2 are conventional telephone exchanges, preferably private branch exchanges. These exchanges are interconnected with each other via physical links of the communications network NET1 or via physical links which are leased from one of the communication networks NET2 and NET3. The communications network NET1 can also be a virtual communication network, wherein the exchanges EX, EX1 and EX2 are connected partially via dial-up lines of the communications networks NET2 and NET3.

Of the exchanges of the communication network NET1, the exchange EX1 is specially designed. It has a database DB for storing parameters for each terminal (of these terminals, only the terminal TEA is shown in FIG. 1 as an example) connected to the exchange EX1, which control the way a connection is established in an overloaded situation. If the exchange EX1 determines that an overloaded situation exists when the connection is established, then it either establishes the connection based on these parameters via one of the other communication networks NET2 and NET3 or does not establish the connection at all.

It is particularly advantageous that in an overloaded situation, the exchange EX1 controls how the requested connection is to be established between one of the terminals connected to the exchange EX1 and another terminal of the communication network NET1. It is also possible that the exchange EX1 controls how the requested connection is to be established between one of the terminals connected to the exchange EX1 and a terminal connected to another communication network. If a respective call request is routed onward to the exchange EX1, then the exchange EX1 may also control the setup of the connections between arbitrary terminals of arbitrary communication networks.

In order to execute the functions assigned to the exchange EX1 within the context of the method of the invention for establishing a connection, the exchange EX1 comprises, in addition to the conventional means found in the exchanges, an additional control unit for receiving a call request, wherein the control unit is capable of determining the capacity available for a call request in the communication network KN1 as well as controlling and selecting alternative connections.

This control unit consists of control programs which run in addition on the conventional control platform—implemented in hardware or software—of the exchange EX1. The form of these programs is determined by the method steps for establishing a connection which will be described in further detail below.

It is also possible that additional or all exchanges of the communication network NET1 are designed identically to the exchange EX1.

In the following, the flow of the method for establishing a connection in an overloaded situation will be described in detail with reference to FIG. 2.

FIG. 2 shows the flow diagram describing the functionality of the additional control unit of the exchange EX1. The flow diagram shows a state WAIT and eleven steps S1 to S11. The state WAIT represents a waiting state where the control unit waits to receive a call request.

Here, subscriber A dials subscriber B. The terminal TEA assigned to him then transmits a call request CALL to the exchange EX1 specifying the terminal TEB as the called terminal. The control unit recognizes in step S1 the arrival of the call request CALL and initiates the step S2.

The control unit checks in step S2 based on the subscriber number recorded in the call request CALL if a connection to a terminal of the communication network NET1 or to one of the other communication networks NET2 and NET3 has to be established. If it is an internal call request, then one skips to step S3.

The exchange EX1 checks in step S3 if sufficient free capacity exists in the communication network NET1 for establishing the requested connection in the communication network NET1 in the direction to the terminal TEB. For this purpose, the exchange EX1 checks the call state of the direct routes C11, C12, and C13 considered for establishing the requested connection. If the call state of the direct routes C11 to C13 does not allow to establish the requested connections, then the control unit decides in step S4 to jump to step S6. Otherwise, the control unit goes to step S5.

It is also possible that the control unit in exchange EX1 checks the complete setup of a connection between the exchanges EX1 and EX2 for several possible routes before making a decision in step S4.

If the call request CALL is not directed towards a terminal of the communication network NET1, then the check of step S3 is not performed, and the call request is routed onward via the respective network access point to the respective requested communication network.

In step S5, the call request is routed onward via the one of the direct routes C11 to C13 which has sufficient capacity for establishing the requested connection. Subsequently, the control unit reverts back to the waiting state. By routing the call request onward, the requested connection between the terminal TEA and TEB is then established internally via communication links of the communication network NET1.

In step S6, the control unit determines the parameters PA assigned to the terminal TEA in the database DB. These parameters indicate if an alternative connection via a different communication network, i.e. via the communication network NET2 or NET3, should be established for the requesting terminal TEA or not. It is therefore possible, by assigning these parameters to the terminals connected to the exchange EX1, to establish a profile which is specific for a terminal with respect to the priority and to the costs in an overloaded situation. These parameters can be established, for example, by establishing in a private branch exchange a subscriber performance parameter "authorization".

It is also possible that instead of these parameters or in addition to these parameters, the following parameters are assigned to the terminals:

parameters specifying via which one of several of the other communication networks NET2 and NET3 an alternative connection should be established. Using such parameters makes sense in particular if the other communication networks are the communication networks of different network operators which bill different transmission costs and provide different access.

Parameters specifying an order of priorities, i.e. the order in which an attempt for establishing an alternate connection via the different other communication networks NET2 and NET3 will be made.

In step S7, there is decided, based on the parameters determined for the requesting terminal, if a connection is to be established via an alternate route or via which other communication network NET2 or NET3 an alternative connection should be established. If the parameters indicate that no alternative connection is to be established, then one continues to step S10. Otherwise, the next step is S8.

In step S8, an alternative route via a different communication network NET2 or NET3 is determined. For this purpose, it is particularly necessary that the exchange EX1 has available respective data about net access points of the communication network NET1 and the possible connecting networks NET2 and NET3 between these network access points.

In step S9, the respective changed call request is routed onward to the selected communication network NET3 via the network interface C3. Subsequently, an alternate connection between the terminal TEA and the terminal TEB is established via the communication network NET3. The control unit then changes into the waiting state WAIT.

In step S10, a message is sent to the requesting terminal TEA indicating an overloaded state of the communication network NET1. This message can be transmitted via a signaling link channel or, for example, transmitted as a voice message via the basic channel.

In step S11, the connection between the terminal TEA and the exchange EX1 is subsequently established. The control unit then changes into the waiting state WAIT.

It is also possible to initiate—after an overloaded state has been indicated—a connection by sending a corresponding control message from the terminal TEA. In a second embodiment, there is described how to carry out the method of the invention for establishing a connection in an overloaded situation in a communication network of the invention which includes a service computer according to the invention. The communication environment in the second embodiment is designed in the same fashion as shown in FIG. 1. The difference to the first embodiment is only that the additional control unit is not located in the exchange EX1, but in a service control point formed by a service computer according to the invention wherein the service control point is connected to the exchange EX1. Here, the exchange EX1 forms a service switching point (SSP= Service Switching Point) which communicates with the service control point (SCP=Service Control Point) using the IN concept (IN=Intelligence Network). In this case, the service control unit can also be connected to additional exchanges EX and EX2 of the communication network NET1 which also include such service switching function.

The additional control unit of the exchange EX1 according to FIG. 1 and FIG. 2 is therefore integrated with the service computer and controls the setup of the connection in an overloaded situation for the call request received by the exchange EX1 or by the several exchanges of the communication system NET1. This is advantageous in that only one central database DB which assigns parameters to all terminals of the communication network NET1, is required for the communication network NET1.

It is also possible to connect such service control point to exchanges of different communication networks, whereby the service control point controls centrally for several communication networks the method of the invention for establishing a connection.

What is claimed is:

1. A method of establishing a connection wherein a requesting terminal (TEA) signals a call request (CALL) to a control unit of a first communications network (NET1), wherein the terminal (TEA) has parameters (PA) assigned to it which are stored in a database (DB), the parameters containing a profile specific to the terminal (TEA) including information with respect to priority of the terminal for using second communications networks (NET2, NET3, . . . ) to provide a connection to an other terminal (TEB) within the first communications network (NET1) if sufficient capacity is not available in the first communications network (NET1), comprising the steps of:

1) determining via the control unit whether sufficient capacity is available in the first communications network (NET1) for establishing the connection requested by the call request to another terminal (TEB) within the first communications network (NET1);

2) if sufficient capacity is not available in the first communications network (NET1), retrieving the parameters (PA) for the requesting terminal (TEA) from the database (DB);

3) determining which one of the second communications networks (NET2, NET3, . . . ) to use based upon the parameters (PA) retrieved for the specific requesting terminal (TEA); and 4) initiating an alternative establishment of the requested connection through the determined second communications networks (NET2, NET3, . . . ) based on the parameters (PA) specifically assigned to the requesting terminal (TEA) so as to establish a connection to the other terminal (TEB) in the first communications network (NET1).

2. A method as claimed in claim 1, wherein if the call request (CALL) requests the establishment of a connection to a requested terminal (TEB) other than the first communications network (NET1), that the call is directed to the other communications network.

3. An exchange (EX1) of a first communications network (NET1), comprising:
   A) means for receiving a call request (CALL) from a requesting terminal (TEA), wherein the terminal (TEA) has parameters (PA) assigned to it which are stored in a database (DB), the parameters containing a profile specific to the terminal (TEA), the parameters including information with respect to priority of the terminal for using second communications networks (NET2, NET3, . . . ) to provide a connection to an other terminal (TEB) within the first communications network (NET1) if sufficient capacity is not available in the first communications network (NET1);
   B) a control unit having means for determining if sufficient capacity is available in the first communications network (NET1) for establishing the connection requested by the call request (CALL), wherein the control unit has means to retrieve the parameters (PA) for the specific requesting terminal (TEA) from the database (DB) so as to determine which one of the second communications networks (NET2, NET3, . . . ) to use based upon the parameters (PA) retrieved for the specific requesting terminal (TEA); and
   C) means for initiating an alternative establishment of the requested connection through the determined second communications networks (NET2, NET3, . . . ) based on the parameters specifically assigned to the requesting terminal (TEA) so as to establish connection to the other terminal (TEB) in the first communications network (NET1).

4. A service computer as claimed in claim 3, wherein the service computer is a service control unit connected to at least one service switching point of the first communications network or of each of the two or more communications networks.

5. A service computer for a first communications network or for two or more communications networks, comprising:
   A) means for receiving data of a call request from a requesting terminal (TEA) within the first communications network, where the requesting terminal (TEA) has parameters (PA) assigned to it which are stored in a database (DB), the parameters containing a profile specific to the terminal (TEA), including information with respect to priority of the terminal for using second communications networks (NET2, NET3, . . . ) to provide a connection to an other terminal (TEB) within the first communications network (NET1) if sufficient capacity is not available in the first communications network (NET1); and
   B) a control unit having means for determining if sufficient capacity is not available in the first communications network (NET1) so as to retrieve the parameters (PA) for the requesting terminal (TEA) from the database (DB), said control unit further having means for determining which one of the second communications networks (NET2, NET3, . . . ) to use based upon the parameters (PA) retrieved for the specific requesting terminal (TEA), and further having means for initiating an alternative establishment of the requested connection through the determined second communications networks (NET2, NET3, . . . ) based on the parameters (PA) specifically assigned to the requesting terminal (TEA) so as to establish a connection to the other terminal (TEB) in the first communications network (NET1).

6. A communications network (NET1) comprising:
   A) a control unit;
   B) a database operatively connected to the control unit;
   C) a plurality of exchanges (EX, EX1, EX2): and
   D) a plurality of terminals (TEA, TEB, . . . ) interconnected to the exchanges;

wherein the control unit has means for establishing a connection for a requesting terminal (TEA), wherein the requesting terminal (TEA) has parameters (PA) assigned to it which are stored in the database (DB), the parameters containing a profile specific to the terminal (TEA), including information with respect to priority of the terminal for using a second communications networks (NET2, NET3, . . . ) to provide a connection to an other terminal (TEB) within the first communications network (NET1) if sufficient capacity is not available in the first communications network (NET1), wherein the control unit has means for determining which one of the second communications networks (NET2, NET3, . . . ) to use if sufficient capacity is not available in the first communications network (NET1) for establishing a connection from the requesting terminal (TEA) to the other terminal (TEB), and further having means for initiating an alternative establishment of the requested connection through the determined second communications networks (NET2, NET3, . . . ) based on the parameters (PA) specifically assigned to the requesting terminal (TEA) so as to establish a connection to the other terminal (TEB) in the first communications network (NET1).

* * * * *